May 2, 1950      C. STRAUB      2,506,395
WAGON BOX STRAIN REDUCER

Filed Jan. 27, 1947      2 Sheets-Sheet 1

Inventor
Carl Straub
By Arthur H. Sturges
Attorney

May 2, 1950 C. STRAUB 2,506,395
WAGON BOX STRAIN REDUCER
Filed Jan. 27, 1947 2 Sheets-Sheet 2

Inventor
Carl Straub
By Arthur H. Sturges
Attorney

Patented May 2, 1950

2,506,395

UNITED STATES PATENT OFFICE 2,506,395

WAGON BOX STRAIN REDUCER

Carl Straub, Avoca, Nebr.

Application January 27, 1947, Serial No. 724,554

16 Claims. (Cl. 280—104)

The present invention relates to wagons and the like and more particularly to the chassis thereof.

It is an object of the invention to provide a wheeled chassis support for a wagon box which is so constructed and the parts thereof are so cooperatively arranged with respect to each other that the bolsters thereof remain aligned in a single plane at times when any one of the four wheels of the chassis sinks into a depression and the other three wheels remain upon level soil, whereby twisting stresses are not applied to said box during traveling movements of the vehicle as heretofore.

It is well known that wagon boxes are often constructed of comparatively thin sheet metal whereby during use a twisting stress is applied to the wagon box and particularly to the bottom thereof incident to the wheels of the chassis striking hummocks of ground or sinking into depressions of the latter, such as at times when a wagon is employed for transporting ears of corn gathered from a corn field of uneven surface contour, whereby wagon boxes have been known to break during their first day's use and practically none thereof, when constructed of sheet metal, are of long use life, and the present invention aims to obviate certain of the undesirable features of the prior practice.

A further object of the invention is to provide a chassis of fewer parts than is preferably employed with respect to the preferred construction, the fewer parts of the modified construction being so cooperatively arranged with respect to each other that the modified particular construction of chassis cushions torsional stresses applied to a wagon box mounted thereon incident to the vehicle traveling over rough terrain, the said particular and more economical construction being particularly useful at times when a wagon box is constructed of wood and is comparatively elongated.

Other and further objects and advantages of the invention will be obvious to those skilled in the art from the following detailed description.

Figure 2:
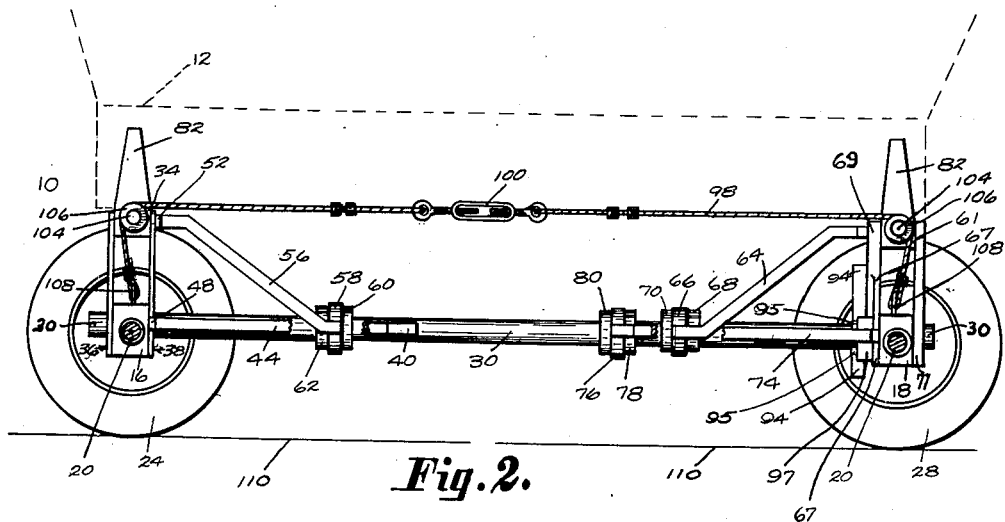
Figure 2 is a longitudinal vertical section thereof, the view being taken approximately on line 2—2 of Figure 1.

Referring now to the drawings for a more particular description, 10 indicates generally the new chassis. Referring to Figure 2, a wagon box is represented by means of dotted lines 12, said wagon box being shown in broken away end elevation in Figure 3 by means of full lines. The bottom of the wagon box 12 is indicated at 14, said bottom usually being formed of light weight sheet metal for providing a comparatively light weight wagon box as is desirable.

The new chassis includes a front or first axle 16 and a like rear or second axle 18, each of which is provided with a skein 20 at each end thereof.

The skeins provide a pivotal mounting or stub axle respectively for the oppositely disposed front wheels 22 and 24 of the front axle 16, and for the like rear wheels 26 and 28 of the rear axle 18, said wheels being of any suitable type and preferably said wheels include pneumatic tires, as shown. Since the wheels are of equal diameter, their respective axles are supported above the soil and normally horizontally at times when the surface of a field or roadway is level.

A wagon frame or reach rod 30 is provided which preferably is tubular, being circular in cross section for providing a pivotal mounting thereon for the rear axle 18; since the rear end of the reach rod extends through the rear axle and midway between the ends of the latter. The front end of the reach rod 30 similarly extends through the front axle 16. However, the rod 30 is locked to the front axle, as later explained, for certain uses.

The vertically disposed front and rear portions of an elongated front bolster 34 are respectively indicated at 36 and 38 and each is provided with a downwardly extending tang like the tang indicated at 32. The upper edges of the wall portions 36 and 38 are each welded to the main body portion of the bolster 34.

The reach rod 30 also extends through the tangs of said portions 36 and 38 for providing a pivotal mounting for the front bolster 34 of the chassis and since the portions 36 and 38 are respectively disposed forwardly and rearwardly of the front axle 16 it will be seen that the bolster 34 is readily swingable in a normally vertical plane with respect to the front axle 16 on its pivotal point, the latter preferably being the reach rod 30 and approximately equi-distantly spaced from the ends of the axle 16 and from the ends of the bolster 34.

Figure 1:
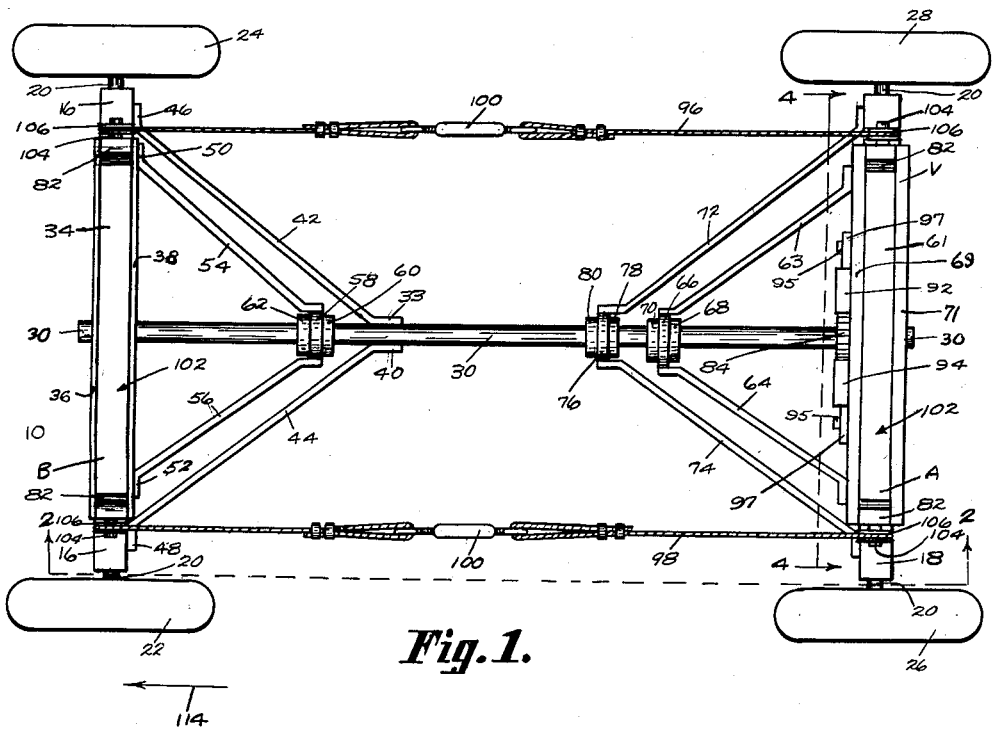
Figure 1 is a top plan view of a wagon chassis depicting an embodiment of the present invention.

As best shown in Figure 1, the rearwardly disposed ends 38 and 40 of oppositely disposed brace bars 42 and 44 are welded or otherwise suitably secured at opposite sides of the reach rod 30 and to the latter. At least one, and preferably two, brace bars are desirable. The brace bars 42 and 44 extend forwardly and divergently, and the forward ends 46 and 48 of the brace bars 42 and 44 respectively are welded or otherwise suitably secured to the front axle 16, preferably adjacent the ends of the latter, in a manner whereby the front axle is non-rotatable with respect to the reach rod 30 and the forward axle 16 is maintained at a right angle with respect to the length of the reach rod at all times during use.

Figure 3:
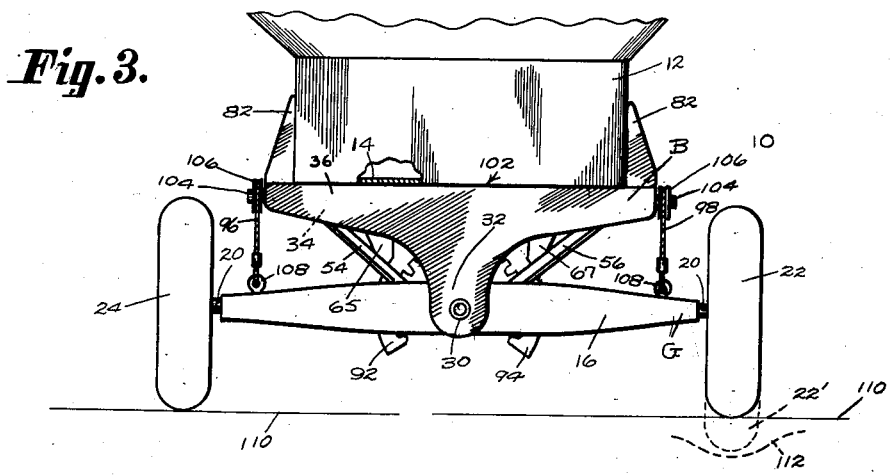
Figure 3 is a front elevation of the new chassis shown in Figure 1.

In order to prevent swaying movements of the upper portion of the bolster 34, anti-sway irons are provided, said irons being disposed at opposite sides of the reach rod 30 and having their forward ends 50 and 52 respectively welded to the rearwardly and vertically disposed surface of the bolster portion 38. The said anti-sway braces 54 and 56 are disposed downwardly from the upper portion of the bolster and convergently toward the reach rod, as shown in Figure 3. At least one, and preferably two anti-sway braces are desirable. The rear ends of the members 54 and 56 are disposed convergently toward each other as shown in Figure 1, being welded to a collar 58, the latter being snugly disposed about the reach rod 30 as best shown in Figure 1. The collar 58 is rotatable in a normally vertical plane with respect to the reach rod, and in order to prevent sliding movements of the collar 58 with respect to the reach rod 30, detent blocks or rings 60 and 62 are disposed at opposite sides of the collar 58 respectively, said rings being welded or otherwise suitably secured to the reach rod 30.

As thus described it will be seen that the front bolster 34 and the front axle 16 are coupled together in a manner whereby relative swinging movements thereof are permitted only in vertical directions during use.

The rear bolster 61 is pivotally connected for swinging movements in a normally vertical plane to the rear axle 18 preferably by means of the rear end of the reach rod 30, since said bolster, as shown in Figure 2, is preferably provided with downwardly disposed tang portions through which the rod extends, said tang portions being formed integral with the forward and rearward vertically disposed portions of the rear bolster and indicated at 69 and 71 respectively.

The upper portions of the portions 69 and 71 are welded or otherwise suitably secured to the main body portion of the rear bolster 61.

Oppositely disposed anti-sway braces 63 and 64 are provided, having their rear ends respectively secured to opposite ends of the rear bolster 61, said braces extending downwardly, as best shown in Figure 2, and convergently towards each other. At least one, and preferably two rearward anti-sway braces are desirable. The forward ends of the braces 63 and 64 are secured to a collar 66, the latter being disposed for rotation in a normally vertical plane about the reach rod 30 between detent rings 68 and 70, said rings each being welded or otherwise rigidly attached to the reach rod 30.

The chassis further includes oppositely disposed brace bars 72 and 74, the rear ends of which are secured to the rear or second axle 18.

At least one, and preferably two rearward brace bars are desirable. The forward ends of the bars 72 and 74 are secured to a collar 76 which is pivotally mounted for rotation in a normally vertical plane about the reach rod 30 and between detent rings 78 and 80. The rings 78 and 80 are welded to the reach rod 30, and as thus described it will be seen that the rear bolster and also the rear axle are pivotally attached together for relative swinging movements only in vertical directions, during which said axle and bolster are maintained at a right angle with respect to the reach rod. It will also be seen that the rear axle is rotatable with respect to the reach rod and that the front axle 16 is non-rotatable with respect to the reach rod. Further, that any one of the bolsters or axles is relatively swingable, in vertical directions, with respect to any of the others.

Figure 4:
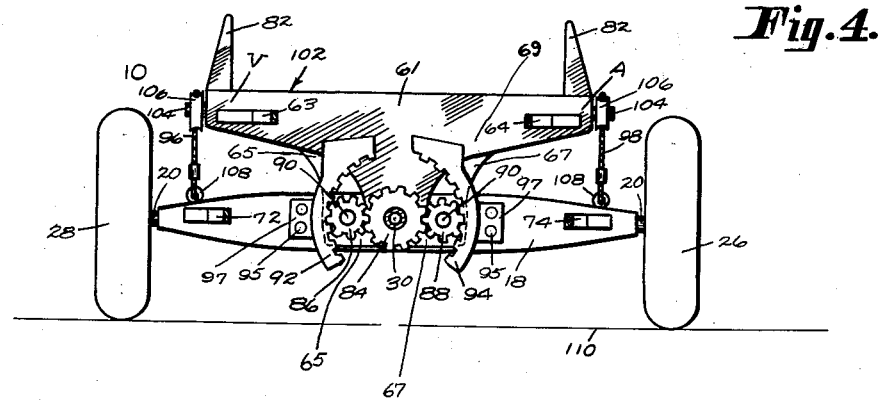
Figure 4 is a transverse section taken approximately on line 4—4 of Figure 1.

The front bolster 34 is provided with oppositely disposed like stanchions or detents 82 between which the wagon box 12 is disposed, as best shown in Figure 3, whereby the wagon box is prevented from sliding movements longitudinally of the front bolster. As shown in Figure 4, the rear bolster is also provided with oppositely disposed stanchions or detents 82 which engage the opposite sides of the wagon box 12, whereby the latter is prevented from sliding transversely of the chassis.

Referring to Figure 4, a pinion 84 is welded or otherwise suitably secured to the reach rod 30 forwardly of the rear axle 18. Like idler pinions 86 and 88 are pivotally mounted, as at 90, respectively to the wings 65 and 67 of the forward wall portion 69 of the rear bolster 61. Teeth of said idler pinions and teeth of the pinion 84 are in engagement at all times during use. The wing portions 65 and 67 are formed integral with the forward vertically disposed wall of the rear bolster and preferably inset with respect to the forward tang portion of the rear bolster as shown in Figures 2 and 4 for receiving and supporting the pivot pins 90 of the idler pinions 86 and 88.

Oppositely disposed like segmental arcuate rack bars 92 and 94 are provided, teeth of which engage teeth of the idler pinions 86 and 88 respectively during use.

The rack bars are each provided with a horizontally extending tab 97. The tabs are inset with respect to their rack bar as shown in Figures 2 and 4. The tabs are secured to the rear axle by any suitable means such as the bolts or keepers 95, whereby at times when a rotary motion is applied to the reach rod 30, in either direction, the pinion 84 is correspondingly rotated, together with the idler pinions, rack bars and the rear bolster, whereby the latter is caused to swing or tip with respect to the rear axle 18.

The wings 65 and 67 of the wall 69 of the rear bolster are spaced away from their adjacent tabs a sufficient distance to permit said vertical swing of the rear bolster.

Since the ratio of that portion of the gear provided by the said pinions and rack bars is so proportioned, it will be seen that at times when the front axle swings, in a vertical direction, the rear bolster is caused to swing with respect to the rear axle approximately one-half the distance of the swing of the front axle and at times when the rear axle is supported in a horizontal position by means of the rear wheels. For certain uses, the rack bars and pinions may be dispensed with and a modified form of construction employed for certain resultants as later herein described.

The mechanism further includes two oppositely disposed like cables 96 and 98 each of which is preferably provided with a turn buckle 100 as best shown in Figures 1 and 2.

The front bolster 34 and the rear bolster 61 between their respective stanchions 82 are each provided with a straight upper edge portion 102 upon which the lower surface of the bottom 14 of the wagon box 12 rests during use, and any suitable means are employed for preventing longitudinal sliding movements of the bar 12.

At each end of each bolster, said ends are provided with like stub axles 104 which provide pivotal mountings for like grooved pulley wheels 106, said pulley wheels all being of the same diameter.

The cables 96 and 98 are reeved over their respective pulley wheels as best shown in Figure 1. The forward ends of the cables are dead-ended to opposite ends of the front axle 16 as best shown in Figure 3, and the rear ends of the said cables are similarly dead-ended to the rear axle 18 as best shown in Figure 4. The turn buckles 100 are preferably employed for maintaining the cables in a taut condition for providing cables of the same length.

If desired, the skeins 20 of the front axle 16 may be pivotally attached to said front axle whereby the front wheels are swingable with respect to the front axle in horizontal directions for facilitating a steering of the vehicle at times when the latter travels around curves on a roadway.

The ends of the cables are preferably dead-ended to eyes 108 which are attached to the front and rear axles respectively.

The cables are employed for causing the front bolster to duplicate a swinging movement of the rear bolster and to an equal extent, whereby the upper surfaces 102 of said bolsters are maintained disposed in a single plane for preventing torsional stresses from being applied to the wagon box 12, the operation being as follows:

In Figures 2, 3 and 4, a horizontally disposed ground line is indicated at 110.

Referring to Figure 3, the dotted line 112 represents a depression in the surface of the soil, said depression or recess being disposed below the ground line 110, and assuming that the front wheel 22, during forward travel of the vehicle in the direction of the arrow 114 (Figure 1), enters the depression and rests upon the bottom of the latter, the front wheel 22 becomes thereby moved downwardly and from the full line position thereof to the dotted line position thereof indicated at 22', and since the oppositely disposed front wheel 24, together with the rear wheels 26 and 28, remain upon the horizontal surface of the soil 110, the front axle 16 becomes tilted and that end thereof which is supported by the wheel 22 moved downwardly, thereby applying a rotary motion to the reach rod 30 since the latter is locked to the front axle by means of the members 42 and 44 as heretofore described.

The rotary movement of the reach rod 30 applies a corresponding movement to the pinion 34 thereby causing the end, indicated at A, of the rear bolster to swing downwardly correspondingly and the end V of the rear bolster to swing upwardly, since the rear axle 18 is maintained in a horizontal position at this time by the rear wheels 28 and 26 resultant from said rear wheels resting upon the surface of the ground 110, and since the pinions and rack bars cause the same, the end A dips downwardly approximately one-half the distance of the downward movement of that end of the front axle 16 which the wheel 22 supports.

Simultaneously, the end B of the front bolster is caused to swing downwardly and to duplicate the swinging movement of the rear bolster to an equal extent by means of the cables, whereby the bolsters are disposed in the same plane although each is tipped with respect to a horizontal line and from their normal horizontal position of parallelism with respect to the ground 110.

Similarly, at times when the other front wheel 24 engages in a depression, the same resultant is attained although at this time the bolsters are tipped with respect to a horizontal line in an opposite direction. Also the same resultant occurs at times when either one of the rear wheels strikes a depression and the front axle remains horizontal. Similarly, the same resultant is attained at times when any of the wheels passes over a hummock of ground which is upwardly disposed with respect to the horizontal line 110.

Figure 5:
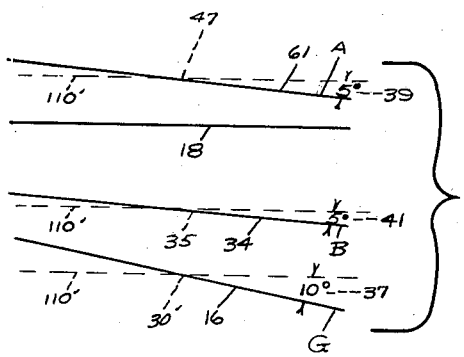
Figure 5 is a diagrammatic illustration of the action of the new chassis during use.

The above described operation is diagrammatically illustrated in Figure 5 in which a horizontally disposed ground line is represented at 110' by means of dotted lines and the front axle 16 is represented by a straight full line.

The pivotal point of the front axle is indicated at 30'; the rear axle is indicated at 18 by means of a full line disposed in parallelism with respect to the dotted ground line 110'. The pivotal point for the rear bolster is indicated at 47 and said bolster is represented by means of a full line 61, the latter being tipped with respect to the solid horizontal line 18 which represents the rear axle in Figure 5. The pivotal point for the front bolster is indicated at 35 and the front bolster is represented by the solid line 34, the latter being tipped with respect to the horizontal line 110'. The pivotal points 30' and 35 may be the same pivot as shown at 30 in Figure 3 if desired.

Assuming that the end G of the front axle 16 swings downwardly ten degrees as indicated at 37 (Figure 5) and at the time the front wheel 22 sinks into the depression 112, as illustrated in Figure 3, and as heretofore explained, the downward swing of the front axle rotates the reach rod 30 correspondingly since said parts are locked together.

The rotary movement of the reach rod 30 causes the rear bolster 61 to swing on its pivot 47 downwardly and but five degrees as indicated at 39 in Figure 5, since the pinion gear causes the same, the rear axle 18 being held horizontal at this time since the rear wheels rest upon the horizontally disposed surface of the ground represented by the dotted line 110' and as shown in Figure 4.

The downward movement of the end A of the rear bolster causes the end B of the front bolster 34 to swing downwardly five degrees as indicated at 41 (Figure 5) resultant from the operation of the cables 96 and 98, whereby the front and rear bolsters are tilted to the same extent and in the same direction, becoming aligned in a single plane. When disposed in said single plane and at times when said bolsters are tilted as above described, or the other ends of said bolsters are disposed downwardly resultant from the other front wheel 24 sinking into a depression or at times when either front wheel rides over a hummock of ground, the entire surface of the bottom 14 of the wagon box 12 is maintained in a single plane and a twisting of said wagon box is prevented since the bottom of the wagon box rests upon the upper edges 102 of the bolsters.

At times when it is desired to dispense with the above described pinions and rack bars, or an equivalent mechanism, for causing the rear bolster to swing only to approximately one-half the extent as the front axle, both bolsters are pivotally attached to their respective axles, and for pivot purposes the reach rod 30 may be employed, it being understood that neither bolster is locked to said reach rod, and when this construction is employed at times when the front axle swings downwardly resultant from a front wheel sinking into a depression in the ground and the other three wheels of the chassis are disposed upon level ground, the cables permit the upper surfaces 102 of the bolsters to be disposed in a single plane, as heretofore described, for a cushioning of torsional stresses applied to the wagon box.

The pinions or a like mechanism are preferably employed for reducing the transverse swinging movements of the wagon box which, without said reduction, would tend to cause certain types of cargo to become cast out of the box at times when the wagon travels over exceedingly rough terrain, and also a mechanism equivalent to said pinions is employed for the advantage of preventing any torsional stresses from being applied to the wagon box at any time during use.

From the foregoing description it is thought to be obvious that a wagon box strain reducer constructed in accordance with my invention is particularly well adapted for use by reason of the convenience and facility with which it may be assembled and operated, and it will also be obvious that my invention is susceptible of some change and modification, including variations in the shape and size of the parts, without departing from the principles and spirit thereof, and for this reason I do not wish to be understood as limiting myself to the precise arrangement and formation of the several parts herein shown in carrying out my invention in practice, except as claimed.

I claim:

1. A wagon chassis comprising a front axle and a like rear axle; two like bolsters, the latter being pivotally attached respectively to said axles for relative swinging movements with respect to their axles; said bolsters being adapted to support a wagon box thereon; a reach rod disposed between said axles; wheels of equal diameter respectively pivotally mounted on the ends of each axle for supporting said bolsters equal distances above and normally horizontal with respect to the surface of a level field or the like; said front axle being rigidly secured to one end of said rod, the other end of said rod constituting the pivotal attachment between the rear bolster and rear axle; gear means actuated by said reach rod for causing the rear bolster to swing on its pivot approximately one-half the distance and responsive to a swinging movement of the front axle; and means including cables for causing the front bolster to swing on its pivot a distance equal and responsive to a swinging movement of the rear bolster at times when the rear axle is maintained horizontal, the chassis being so constructed that said bolsters are maintained aligned in the same plane with respect to each other during operation.

2. A wagon chassis as defined in claim 1 which further includes anti-sway braces for preventing said bolsters from moving longitudinally with respect to the chassis.

3. A wagon chassis as defined in claim 1 which further includes a wagon box stanchion secured to each end of each bolster for preventing sliding movements of said box transversely of the chassis.

4. A wagon chassis as defined in claim 1 which further includes braces disposed at each side of the reach rod thereof, certain of said braces having ends secured to the rear bolster and others having ends secured to the front bolster, the other ends of said braces being pivotally connected to said reach rod for maintaining the bolsters at approximately a right angle with respect to said rod and permitting said bolsters to rotate transversely of the chassis in vertical directions.

5. In a wagon chassis: front and rear axles; a reach rod having an end rigidly attached to the front axle, the other end of said rod being pivotally disposed through the rear axle, said ends of said rod being disposed approximately midway between the ends of said axles respectively; two like bolsters having straight edge portions disposed above the axles and other portions pivotally attached to said axles respectively, said straight edges being adapted to support a wagon box thereon; gear means for causing the rear bolster to swing responsive to a rotary movement of said rod and a swinging movement of said front axle at times when the rear axle does not swing; and means for causing the front bolster to simultaneously duplicate the swing of the rear bolster for preventing twisting of said box, said duplicate swing-causing means comprising a pulley wheel pivotally mounted on each end of each bolster, two oppositely disposed cables of equal length respectively reeved over the pulleys of the front and rear bolsters, ends of said cables being attached to the front axle, the other ends of said cables being attached to the rear axle.

6. A wagon chassis as claimed in claim 5 in which the cables are each provided with a turn buckle for taking up slack conditions thereof.

7. A wagon chassis as defined in claim 5 which further includes a detent on each end of each bolster for preventing sliding movements of said box longitudinally of said straight edges.

8. A wagon chassis comprising front and rear axles; wheels on the ends of said axles for supporting each of them in a normal horizontal position; means for maintaining said axles spaced apart forwardly and rearwardly of each other; a wagon box bolster pivotally supported above and by each axle, said axles and bolsters being relatively swingable only in vertical directions, any one thereof with respect to any one of the others; means for causing the rear bolster to swing with respect to the rear axle in the same direction and responsive to a swinging movement of the front axle; and means for causing the front bolster to swing with respect to the front axle in the same direction as the rear bolster and responsive to the swing of the latter, the construction being such that said bolsters swing to an equal extent simultaneously at times when the rear axle does not swing for maintaining the bolsters aligned in the same plane with respect to each other during use.

9. A wagon chassis comprising a first axle and a second axle, said axles being spaced apart forwardly and rearwardly of each other respectively; like bolsters pivotally connected respectively to said axles; like wheels axially disposed, one each on each end of each axle for supporting the axles above the soil in a normal horizontal position; said bolsters having portions disposed above said axles; means for maintaining said portions spaced apart for supporting a wagon box upon them; said axles and bolsters being relatively swingable only in vertical directions, any one thereof with respect to any one of the others; means for causing the bolster of the second axle to swing with respect to its axle in the same direction and responsive to a swinging movement of the first axle; and means for causing the bolster of the first axle to duplicate the swing of the bolster of the second axle simultaneously responsive to the swing of the bolster of said second axle at times when the said second axle remains horizontal.

10. A wagon chassis comprising a forward and a rearward axle, like wheels axially disposed, one each on each end of each axle for supporting the axles above the ground in normal position parallel with the surface of said ground; means for maintaining said axles spaced apart forwardly and rearwardly of each other; a bolster pivotally connected to each axle, said bolsters each having a portion disposed above its axle, said portions being adapted to support a wagon box thereon above said bolsters; said axles and bolsters being relatively swingable, any one thereof with respect to any one of the others, only in vertical directions; and means for causing said bolsters to swing in unison to an equal extent with respect to said ground responsive to a swinging movement of one of said axles with respect to said ground at times when the other axle remains parallel with respect to said ground during a forward movement of said chassis.

11. A wagon chassis as defined in claim 10 which further includes a detent on each end of each bolster for receiving said wagon box therebetween.

12. A wagon chassis comprising front and rear axles; wheels on the ends of said axles for supporting each of them in a normally horizontal position; means for maintaining said axles normally horizontally spaced apart; a wagon box bolster pivotally supported normally above and by each axle, said axles and bolsters being relatively swingable only in normally vertical planes, any one thereof with respect to any one of the others; pulleys attached one each to the ends of said front and rear bolsters; and two cables each secured to a different end of said front axle and each respectively secured to the corresponding end of said rear axle, said cables each being rove through those of said pulleys which are adjacent those ends of said axles to which each cable is secured.

13. In a wagon-box strain reducer: a frame; an elongated axle for supporting a wheel at each of its ends, said axle being pivotally secured to said frame for movements only in a normally vertical plane at a point approximately equi-distant from the ends of said axle; an elongated bolster disposed normally vertically spaced apart from said axle, said bolster being pivotally secured to said axle at a point approximately equi-distant from the ends of said bolster and from the ends of said axle, said pivotal bolster connection being such as to permit said bolster to rotate only in a normally vertical plane; a second like axle rigidly secured to said frame and normally disposed in parallelism with said first axle; a second like bolster pivotally secured to said second axle in a manner for rotation in a plane in parallelism with said first mentioned plane; means for securing said first mentioned bolster to said frame in such a manner that when said frame rotates with respect to said first mentioned axle in one direction said first mentioned bolster will rotate in the same direction with respect to said first mentioned axle an amount equal to one-half of the relative rotation of said first mentioned axle and said frame.

14. In a wagon-box strain reducer: a frame; an elongated axle for supporting a wheel at each of its ends, said axle being pivotally secured to said frame for movements only in a normally vertical plane at a point approximately equi-distant from the ends of said axle; an elongated bolster disposed normally vertically spaced apart from said axle, said bolster being pivotally secured to said axle at a point approximately equi-distant from the ends of said bolster and from the ends of said axle, said pivotal bolster connection being such as to permit said bolster to rotate only in a normally vertical plane; a second like axle rigidly secured to said frame and normally disposed in parallelism with said first axle; a second like bolster pivotally secured to said second axle in a manner for rotation in a plane in parallelism with said first mentioned plane; means for securing said first mentioned bolster to said frame in such a manner that when said frame rotates with respect to said first mentioned axle in one direction said first mentioned bolster will rotate in the same direction with respect to said first mentioned axle a proportional amount to and a lesser amount than the relative rotation of said first mentioned axle and said frame.

15. In a wagon-box strain reducer: a frame; an elongated axle for supporting a wheel at each of its ends, said axle being pivotally secured to said frame for movements only in a normally vertical plane at a point approximately equi-distant from the ends of said axle; an elongated bolster disposed normally vertically spaced apart from said axle, said bolster being pivotally secured to said axle at a point approximately equi-distant from the ends of said bolster and from the ends of said axle, said pivotal bolster connection being such as to permit said bolster to rotate only in a normally vertical plane; a second like axle rigidly secured to said frame and normally disposed in parallelism with said first axle; a second like bolster pivotally secured to said second axle in a manner for rotation in a plane in parallelism with said first mentioned plane; gear means for securing said first mentioned bolster to said frame in such a manner that when said frame rotates with respect to said first mentioned axle in one direction said first mentioned bolster will rotate in the same direction with respect to said first mentioned axle a proportional amount to and a lesser amount than the relative rotation of said first mentioned axle and said frame.

16. In a wagon-box strain-reducing mechanism: a normally horizontal reach-rod; an elongated axle for supporting a wheel at each of its ends, said axle being rotatably secure to said reach-rod at a point approximately equidistant from the ends of said axle; an elongated bolster disposed normally vertically spaced apart from said axle, said bolster being rotatably mounted on said axle at a point approximately equidistant from the ends of said bolster, said rotatable connections being such as to permit the corresponding ends of said axle and bolster to rotate only in directions toward and away from each other; two collars rotatably disposed about said reach rod and spaced from said axle; means preventing said collars from moving longitudinally of said reach rod; bracing members connecting the outer ends of said axle to one of said collars; and other bracing members independently connecting said bolster to the other of said collars for independent rotation of said axle and said bolster.

CARL STRAUB.

REFERENCES CITED

The following references are of record in the file of this patent:

UNITED STATES PATENTS

| Number | Name | Date |
|---|---|---|
| 278,984 | Lowe | June 5, 1883 |
| 2,232,549 | McNamara | Feb. 18, 1941 |
| 2,364,842 | Feigelson | Dec. 12, 1944 |
| 2,423,585 | Daugherty | July 8, 1947 |